United States Patent
Strobl et al.

(10) Patent No.: US 7,853,015 B2
(45) Date of Patent: Dec. 14, 2010

(54) GROUP KEY EXCHANGES WITH FAILURES

(75) Inventors: Reto Strobl, Weesen (CH); Christian Cachin, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 12/191,647

(22) Filed: Aug. 14, 2008

(65) Prior Publication Data

US 2008/0304662 A1    Dec. 11, 2008

Related U.S. Application Data

(63) Continuation of application No. 10/964,446, filed on Oct. 13, 2004, now Pat. No. 7,444,514.

(30) Foreign Application Priority Data

Oct. 15, 2003   (EP)   ................................. 03405739

(51) Int. Cl.
H04L 9/06 (2006.01)
(52) U.S. Cl. ....................................................... 380/44
(58) Field of Classification Search ................... 380/44, 380/273, 277, 278; 713/171
See application file for complete search history.

(56) References Cited

U.S. PATENT DOCUMENTS

| | | | |
|---|---|---|---|
| 4,569,015 A | 2/1986 | Dolev et al. | |
| 6,671,821 B1 | 12/2003 | Castro et al. | |
| 6,941,457 B1 | 9/2005 | Gundavelli et al. | |
| 7,260,716 B1 | 8/2007 | Srivastava et al. | |
| 7,340,603 B2 | 3/2008 | Asano et al. | |
| 2004/0139146 A1 | 7/2004 | Cachin et al. | |

OTHER PUBLICATIONS

Wei-Chi Ku, et al., An Improved Key Management Scheme for Large Dynamic Groups Using One-Way Function Trees, 2003, IEEE Department of Computer Sciences and Information Engineering.
ELK, A New Protocol for Efficient Large-Group Key Distribution, 2001, IEEE—University of California Berkeley.
Sanjeev Setia, et al., A Scalable Group Re-Keying Approach for Secure Multicast, 2000, IEEE Center for Secure Information Systems.

*Primary Examiner*—Ellen Tran
(74) *Attorney, Agent, or Firm*—Cantor Colburn LLP

(57) ABSTRACT

A method for generating a session key on demand in a network among participating network devices, including choosing a private and public key according to a public key encryption scheme, and broadcasting the public key to each other participating network device; choosing a local contribution value from a multiplicative group of size q; encrypting the local contribution value under the received public key to an encrypted contribution value and sending the encrypted contribution value; receiving encrypted contribution values and deriving decrypted contribution values by applying the private key; deriving a blinded session key from the decrypted contribution values and the local contribution value; agreeing on one of the blinded session keys by using an agreement protocol; and deriving the session key from the agreed-on blinded session key by applying one of the decrypted contribution values and the contribution value A corresponding computer program element, computer program product, and computer device.

24 Claims, 4 Drawing Sheets

GROUP KEY EXCHANGES WITH FAILURES

CROSS REFERENCE TO RELATED APPLICATIONS

This application is a continuation application of U.S. Ser. No. 10/964,446 filed Oct. 13, 2004, which claims priority to European Patent Application No. 03405739.8, filed Oct. 15, 2003, and all the benefits accruing therefrom under 35U.S.C. §119, the contents of each which in its entirety are herein incorporated by reference.

TECHNICAL FIELD

The present invention is related to a method for generating a session key on demand in a network among n participating network devices with up to a number t of faulty devices. Moreover, the invention is also related to a computer program element, a computer program product stored on a computer usable medium, and a computer device for executing the computer program product.

BACKGROUND

Group key exchange (GKE) protocols allow a group of parties or participating network devices communicating over an asynchronous network of point-to-point links to establish a common session key such that anyone outside the group that can only observe the network traffic cannot learn this key. That means an adversary which fully controls the network links cannot learn the key. The session key can later be used to achieve cryptographic goals like for example multicast message confidentiality, or multicast data integrity. Hence, group key exchange protocols are relevant to applications such as secure video- or teleconferencing, or other collaborative applications.

The primary goals of a group key exchange protocol is to ensure secrecy of the session key, and to ensure that every member of the group eventually terminates the protocol and computes the session key. So far, group key exchange protocols have been designed to meet these goals only as long as all members of the group follow the protocol specification, as for example described in the publication by M. Burmester and Y. Desmedt, "A secure and efficient conference key distribution system", in Eurocrypt '94, 1994. However, the known protocols have the drawback that if only a single party crashes, i.e., stops to participate in the protocol, then no party of the group will terminate the protocol anymore. On one side, this makes such protocols specifically vulnerable to denial of service attacks, as the execution time of the protocol is determined by the slowest member of the group. On the other side, this drawback also imposes undesired restrictions on an application built on top of the group key exchange protocol. For example, a secure video conference involving a large number of participants could not start until the last member has joined the system.

From the above it follows that there is still a need in the art for an improved protocol that tolerates any minority of parties to crash. Henceforth, a party that crashes is called faulty. The solution should use a constant number of rounds, in order to makes it suitable for use in practice.

BRIEF SUMMARY

Group key exchanges with failures is provided. An exemplary method embodiment includes each participating device choosing a private and public key according to a public key encryption scheme, and broadcasting the public key to each other participating network device; choosing a local contribution value from a multiplicative group of size q; encrypting the local contribution value under the received public key to an encrypted contribution value and sending the encrypted contribution value; receiving encrypted contribution values and deriving decrypted contribution values by applying the private key; deriving a blinded session key from the decrypted contribution values and the local contribution value; agreeing on one of the blinded session keys by using an agreement protocol; and deriving the session key from the agreed-on blinded session key by applying one of the decrypted contribution values and the contribution value. Corresponding exemplary computer program element, computer program product, and computer device embodiments are also included.

Additional features and advantages are realized through the techniques of the present invention. Other embodiments and aspects of the invention are described in detail herein and are considered a part of the claimed invention. For a better understanding of the invention with advantages and features, refer to the description and to the drawings.

The drawings are provided for illustrative purposes only.

DETAILED DESCRIPTION

Figure 1:
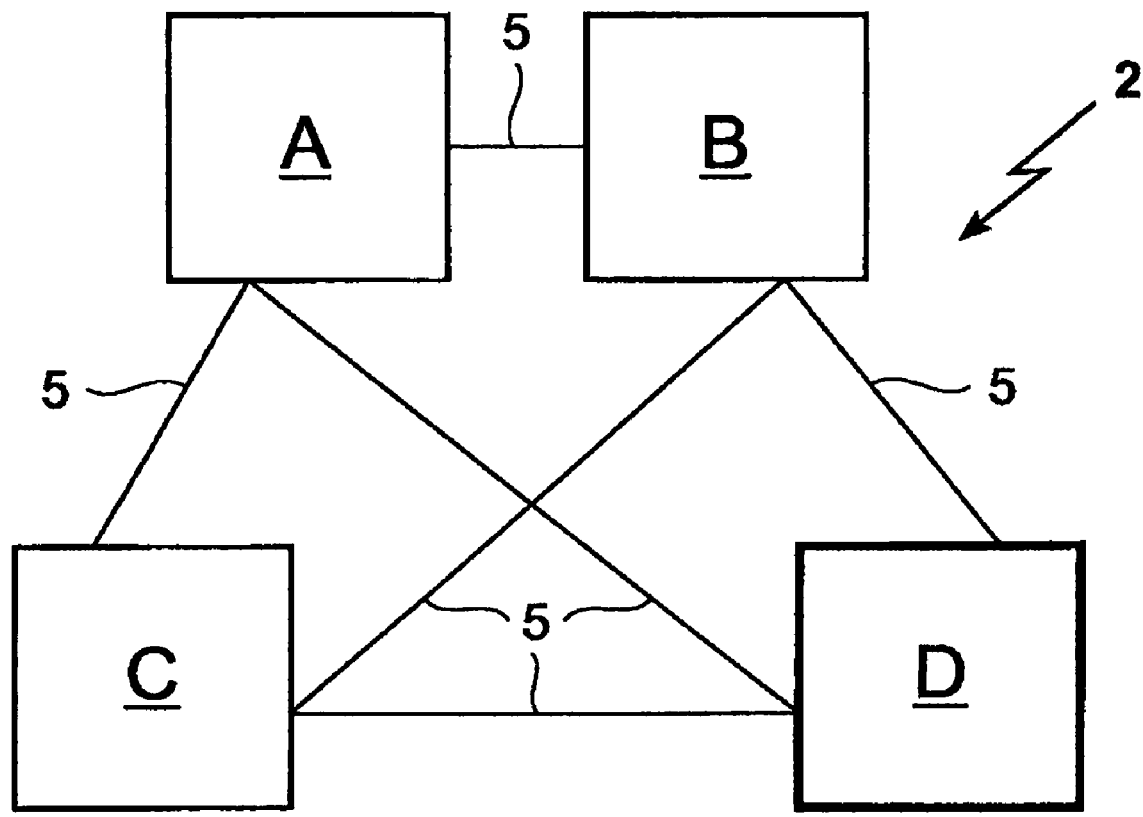
FIG. 1 shows a typical asynchronous network with multiple participating network devices.

FIG. 1 shows an example of a common computer system 2 consisting here of four participating network devices A, B, C, D, which are connected via communication lines 5 to a network, e.g. the Internet. The system, in which a group key exchange protocol is performed, may have t faulty devices. Such faulty device is here the participating network device B also designated by "X". Each participating network device A, B, C, D may be any type of computer device known in the art from a computer on a chip, a wearable or laptop computer, a mobile phone to a large computer system. The communication lines can be any communication means commonly known to transmit data or messages from one participating network device A, B, C, D to another. For instance, the communication lines may be either single, bi-directional communication lines between each pair of participating network devices A, B, C, D or one unidirectional line in each direction between each pair of participating network devices A, B, C, D. The computer system 2 and communication lines are well known in the art. It is possible that each of the participating network devices A, B, C, D sends information to itself; in this case an equivalent result could be achieved by merely moving data within the participating network device and not sending it over a communication line to itself. The common computer system 2 is shown to facilitate the description of a described group key exchange protocol for generating a session key sk on demand in an asynchronous network.

The following steps indicate the described group key exchange protocol among a fixed set of participating network devices that tolerates any minority of parties or devices to crash. A series of messages is sent and received by each participating network device A, B, C, D.

Figure 2:
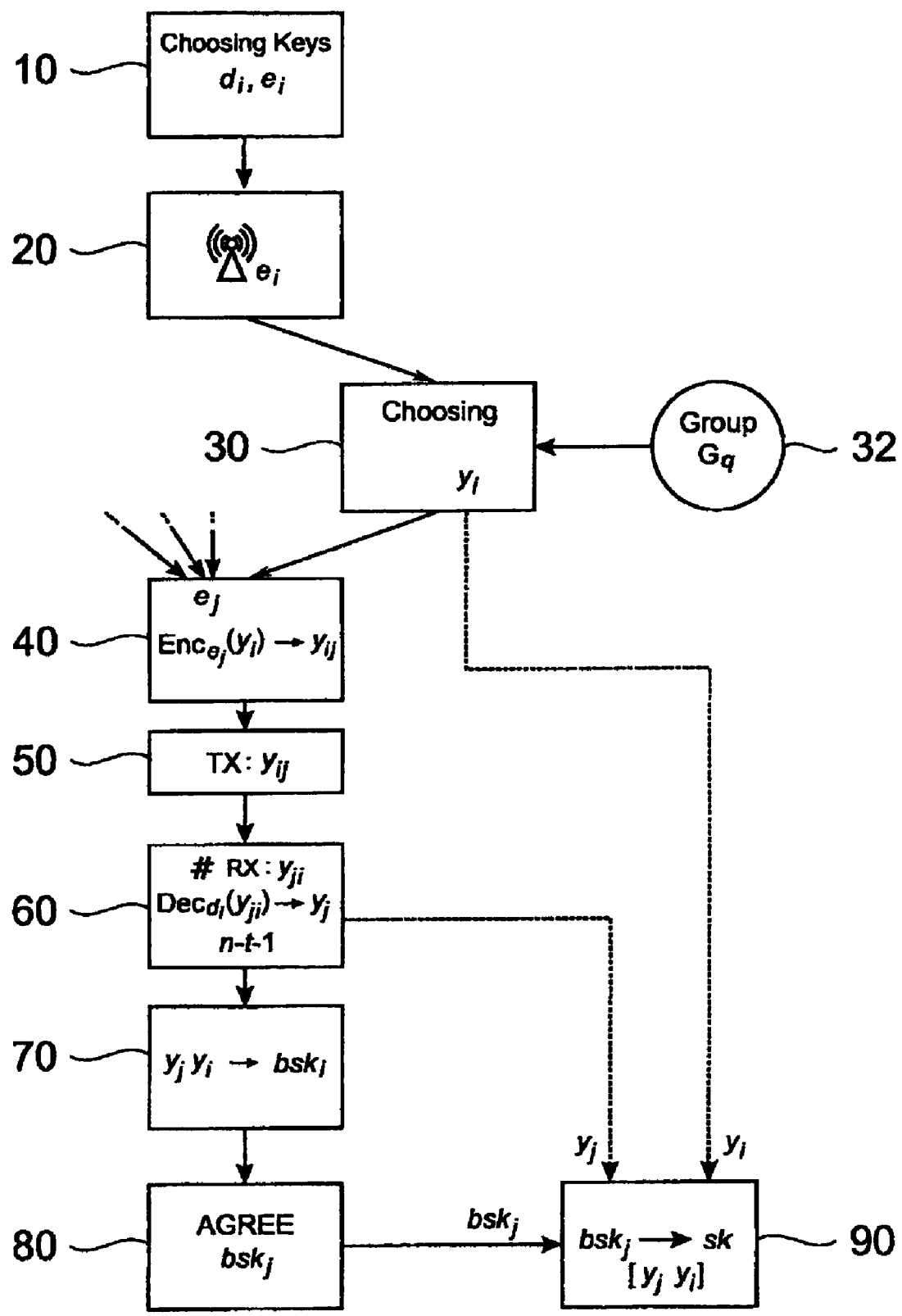
FIG. 2 shows a schematic diagram of the group key exchange protocol according to the present invention.

FIG. 2 shows a schematic diagram of the described group key exchange protocol in which the session key sk is generated on demand in the network among n participating network devices A, B, C, D with up to a number t of faulty devices, with t<n/2. In general, each participating network device sends and receives a series of messages and performs the following described steps. In view of simplicity, the following steps are regarded for the participating network device D, also herein regarded as the device with the index i in an enumeration of the participating network devices. At first, as indicated with step 10, a private and public key $d_i$, $e_i$ are chosen according to a public-key encryption scheme, e.g. El Gamal or RSA, and then, as indicated with step 20, the public key $e_i$ is broadcast to each participating network device A, B, C. As indicated with step 30, a local contribution value $y_i$ is chosen from a multiplicative group $G_q$ of size q, indicated in circle 32.

As indicated with step 40, when the public key $e_j$ from another participating network device A, B, C is received, the local contribution value $y_i$ is encrypted under the received public key $e_j$ to an encrypted contribution value $y_{ij}$ and sent to the respective participating network device A, B, C from which the public key $e_j$ was received, as indicated with step 50. Herein the index j denotes one of the another participating network device A, B, C. When at least n−t−1 encrypted contribution values $y_{ji}$ are received then decrypted contribution values $y_j$ can be decrypted by applying the private key $d_i$, as indicated with step 60. As indicated with step 70, a blinded session key $bsk_i$ is derived from the decrypted contribution values $y_j$ and the local contribution value $y_i$.

As indicated with step 80, the participating network devices A, B, C, D then perform an agreement protocol to agree on the blinded session key $bsk_j$ as computed by one of the participating network devices. The agreement protocol may be performed with or without a dealer. Such an agreement protocol is disclosed in US20010039630A1, entitled "Method of achieving multiple processor agreement in asynchronous networks", presently assigned to the assignee of the instant application and the disclosure of which is incorporated herein by reference.

Finally, as indicated with step 90, the session key sk is derived from the agreed-on blinded session key $bsk_j$ by applying one of the decrypted contribution values $y_j$ and the local contribution value $y_i$. As indicated by dotted arrow lines in the figure, the contribution value $y_i$ arises from step 30 whilst the decrypted contribution values $y_j$ was obtained in step 60.

Figure 3:
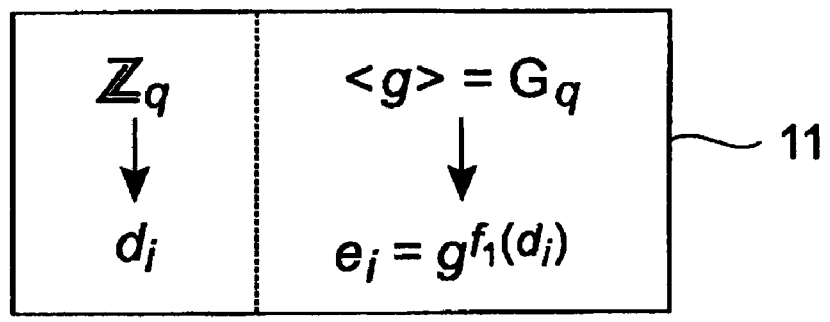
FIGS. 3 to 8 show more details to the group key exchange protocol of FIG. 2.

FIGS. 3 to 8 show further details to the group key exchange protocol of FIG. 2. As indicated in FIG. 3 with step 11, the private key $d_i$ in step 10 can be chosen as a random element from a set $Z_q$ of positive integers modulo q, where q is preferably a large prime, and the public key $e_i$ is derived by raising a generator g of the multiplicative group $G_q$ to the power of a first monotone function $f_1$ of the private key $d_i$. This mathematically reads as:

$$e_i = g^{f_1(d_i)}.$$

Figure 4:
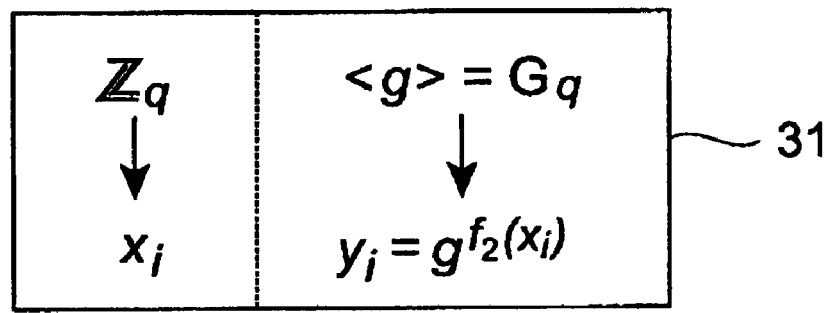

As indicated in FIG. 4 with step 31, the local contribution value $y_i$ in step 30 can be chosen by first choosing a random value $x_i$ from the set $Z_q$ and then deriving the contribution value $y_i$ by raising the generator g to the power of a second monotone function $f_2$ of the random value $x_i$, which reads as:

$$y_i = g^{f_2(x_i)}.$$

Figure 5:
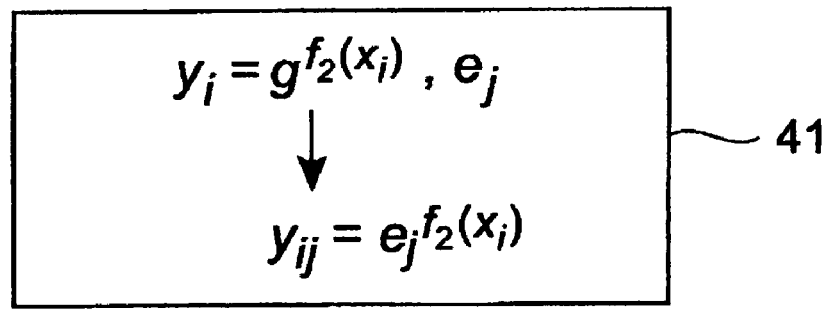

As indicated in FIG. 5 with step 41, the encryption in step 40 of the contribution value $y_i$ under the received public key $e_j$ to the encrypted contribution value $y_{ij}$ can be performed by raising the received public key $e_j$ to the power of the second monotone function $f_2$ of the random value $x_i$, which can be expressed by the formula:

$$y_{ij} = e_j^{f_2(x_i)}.$$

Figure 6:
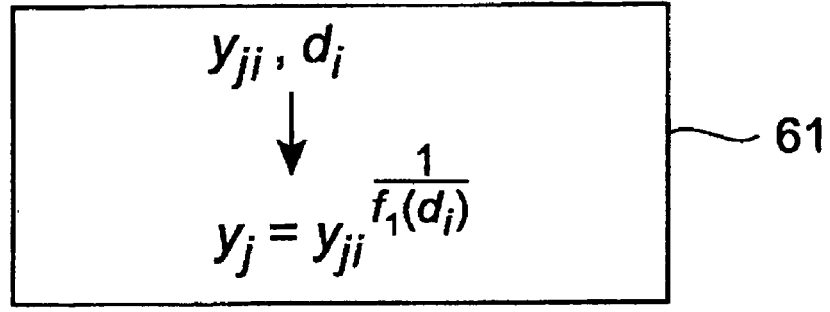

As indicated in FIG. 6 with step 61, the decrypted contribution values $y_j$ in step 60 are derivable by raising the encrypted contribution value $y_{ji}$ to the power of the multiplicative inverse of the first monotone function $f_1$ of the private key $d_i$. This can also be described by:

$$y_j = y_{ji}^{\frac{1}{f_1(d_i)}}.$$

It is noticed that the decrypted contribution value $y_j$ derived from the encrypted contribution value received from some other participating network device is the same as the local contribution value of this other device.

Figure 7:
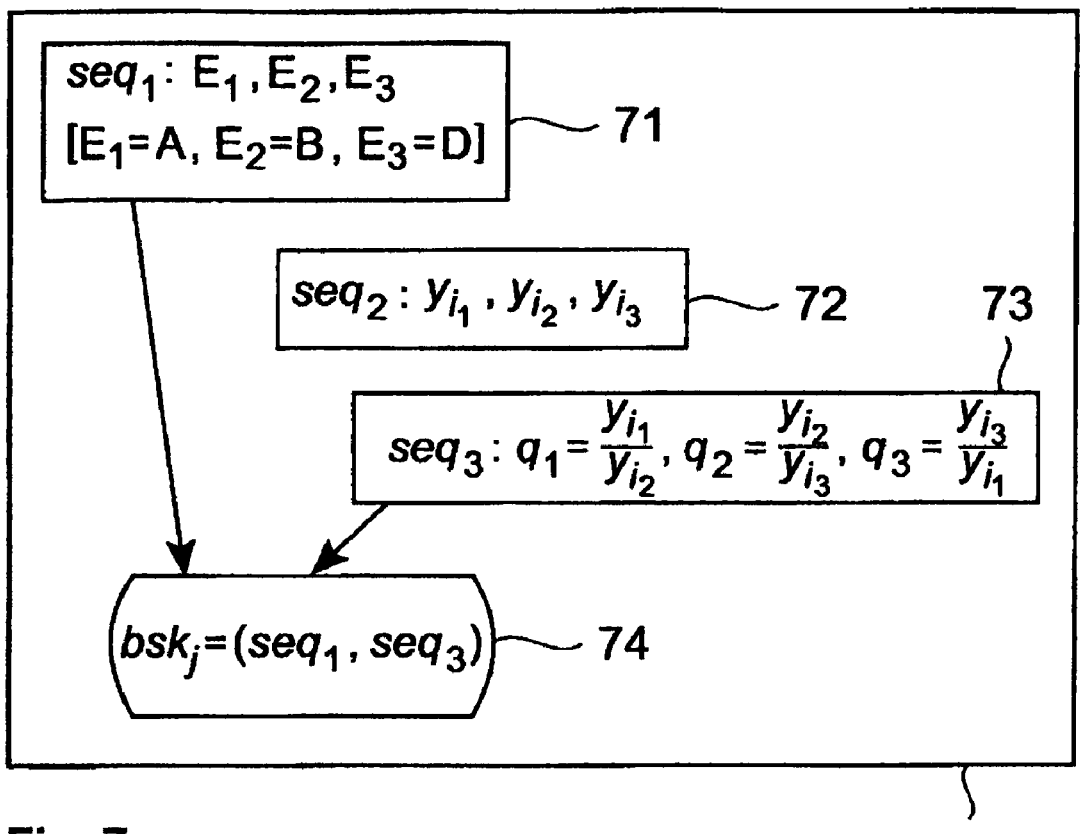

As indicated in FIG. 7, the step 70 of deriving the blinded session key $bsk_i$ can comprise the following steps 71 to 74. As indicated in step 71, a first sequence $seq_1$ of at least n−t participating network devices $E_1$, $E_2$, $E_3$ is derived. The first sequence $seq_1$ comprises here the local participating network device D and the participating network devices A, B from which the at least n−t−1 encrypted contribution values $y_{ji}$ have been received. For example, the sequence could be allocated as [$E_1$=A, $E_2$=B, $E_3$=D], as shown in the figure. In step 72, a second sequence $seq_2$ of at least n−t contribution values $y_{i_1}$, $y_{i_2}$, $y_{i_3}$ is derived, where the m'th contribution value $y_{i_m}$ is the local contribution value $y_i$ of the m'th participating network device $E_m$. Further, as indicated in step 73, a third sequence $seq_3$ of at least n−t quotients $q_1$, $q_2$, $q_3$ is computed, where the m'th quotient $q_m$ is defined as the m'th contribution value $y_{i_m}$ divided by the m+1 modulo n−t'th contribution value $y_{i_{m+1 \mod q}}$, which here is $$q_1 = \frac{y_{i_1}}{y_{i_2}}, \quad q_2 = \frac{y_{i_2}}{y_{i_3}}, \quad q_3 = \frac{y_{i_3}}{y_{i_1}}.$$

Finally, as indicated by the arrows and step 74, the blinded session key $bsk_i$ is defined as the first sequence $seq_1$ and the third sequence $seq_3$, that is $bsk_i = (seq_1, seq_3)$.

Figure 8:
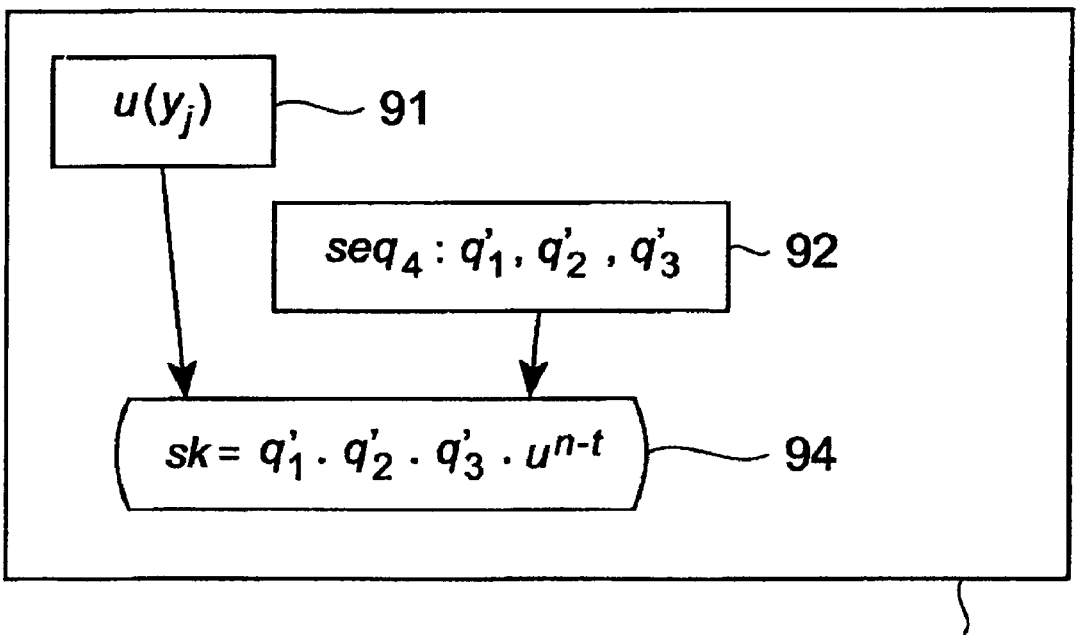

As indicated in FIG. 8, the step 90 of deriving the session key sk can comprise the following steps 91 to 93. As indicated in step 91, an un-blinding value u can be derived as the local contribution value $y_j$ of the k'th participating network device $E_k$ defined by the agreed-on blinded session key $bsk_j$, where k is arbitrary. Moreover, as indicated in step 92, a fourth sequence $seq_4$ of at least n−t modified quotients $q'_1$, $q'_2$, $q'_3$ is derived, in which the m'th modified quotient $q'_m$ is defined as the m'th power of the k+m modulo n−t'th quotient $q_{k+m \mod n-t}$ defined by the agreed-on blinded session key $bsk_j$. Finally, as indicated by the arrows and step 93, the session key sk is derived as the product of the modified quotients $q'_1$, $q'_2$, $q'_3$ multiplied with the n−t'th power of the un-blinding value u, which also reads as:

$$sk = q'_1 * q'_2 * q'_3 * u^{n-t}.$$

Any disclosed embodiment may be combined with one or several of the other embodiments shown and/or described. This is also possible for one or more features of the embodiments.

The present invention can be realized in hardware, software, or a combination of hardware and software. Any kind of computer system—or other apparatus adapted for carrying out the method described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

What is claimed is:

1. A method for generating a session key (sk) on demand in a network among n participating network devices (A, B, C, D) with up to t faulty devices, wherein t<n/2, the method comprising each participating network device (D):
   choosing a private and public key ($d_i$, $e_i$) according to a public key encryption scheme, and broadcasting the public key ($e_i$) to each other participating network device (A, B, C);
   choosing a local contribution value ($y_i$) from a multiplicative group ($G_q$) of size q;
   in each case of receiving a public key ($e_j$) from one of the other participating network devices (A, B, C), encrypting the local contribution value ($y_i$) under the received public key ($e_j$) to an encrypted contribution value ($y_{ij}$) and sending in reply to the one of the other participating network devices (A, B, C) the encrypted contribution value ($y_{ij}$);
   receiving at least n−t−1 encrypted contribution values ($y_{ji}$) and deriving decrypted contribution values ($y_j$) by applying the private key ($d_i$);
   deriving a blinded session key ($bsk_i$) from the decrypted contribution values ($y_j$) and the local contribution value ($y_i$);
   agreeing on one of the blinded session keys ($bsk_j$) by using an agreement protocol; and
   deriving the session key (sk) from the agreed-on blinded session key ($bsk_j$) by applying one of the decrypted contribution values ($y_j$) and the contribution value ($y_i$).

2. The method according to claim 1, wherein choosing a private and public key ($d_i$, $e_i$) according to a public key encryption scheme comprises choosing the private key ($d_i$) as a random element from a set $Z_q$ of positive integers modulo q, where q is a prime, and the public key ($e_i$) is derived by raising a generator (g) of the multiplicative group ($G_q$) to the power of a first monotone function ($f_1$) of the private key ($d_i$).

3. The method according to claim 2, wherein choosing a local contribution value ($y_i$) from a multiplicative group ($G_q$) of size q comprises choosing the local contribution value ($y_i$) by first choosing a random value ($x_i$) from the set $Z_q$ and then deriving the contribution value ($y_i$) by raising the generator (g) to the power of a second monotone function ($f_2$) of the random value ($x_i$).

4. The method according to claim 3, wherein encrypting the local contribution value ($y_i$) under the received public key ($e_j$) to an encrypted contribution value ($y_{ij}$) is performed by raising the received public key ($e_j$) to the power of the second monotone function ($f_2$) of the random value ($x_i$).

5. The method according to claim 4, wherein deriving decrypted contribution values ($y_j$) by applying the private key ($d_i$) comprises deriving the decrypted contribution values ($y_j$) by raising the encrypted contribution ($y_{ji}$) to the power of the multiplicative inverse of the first monotone function ($f_1$) of the private key ($d_i$).

6. The method according to claim 1, wherein deriving a blinded session key ($bsk_i$) from the decrypted contribution values ($y_j$) and the local contribution value ($y_i$) comprises:
   deriving a first sequence of at least n−t participating network devices ($E_1$, $E_2$, $E_3$) comprising the local participating network device (D) and the participating network devices (A, B) from which the at least n−t−1 encrypted contribution values ($y_{ji}$) have been received;
   deriving a second sequence of at least n−t contribution values ($y_{i1}$, $y_{i2}$, $y_{i3}$), where the m'th contribution value ($y_{im}$) is the local contribution value ($y_i$) of the m'th participating network device ($E_m$);
   computing a third sequence of at least n−t quotients ($q_1$, $q_2$, $q_3$) where the m'th quotient ($q_m$) is defined as the m'th contribution value ($y_{im}$) divided by the m+1 modulo n−t'th contribution value ($y_{im+1 \bmod q}$); and
   defining the blinded session key ($bsk_i$) as the first sequence and the third sequence.

7. A computer program element comprising program code means for performing a method for generating a session key (sk) on demand in a network among n participating network devices (A, B, C, D) with up to t faulty devices when the computer program element is run on a computer, wherein t<n/2, the method comprising each participating network device (D):
   choosing a private and public key ($d_i$, $e_i$) according to a public key encryption scheme, and broadcasting the public key ($e_i$) to each other participating network device (A, B, C);
   choosing a local contribution value ($y_i$) from a multiplicative group ($G_q$) of size q;
   in each case of receiving a public key ($e_j$) from one of the other participating network devices (A, B, C), encrypting the local contribution value ($y_i$) under the received public key ($e_j$) to an encrypted contribution value ($y_{ij}$) and sending in reply to the one of the other participating network devices (A, B, C) the encrypted contribution value ($y_{ij}$);
   receiving at least n−t−1 encrypted contribution values ($y_{ji}$) and deriving decrypted contribution values ($y_j$) by applying the private key ($d_i$);
   deriving a blinded session key ($bsk_i$) from the decrypted contribution values ($y_j$) and the local contribution value ($y_i$);
   agreeing on one of the blinded session keys ($bsk_j$) by using an agreement protocol; and
   deriving the session key (sk) from the agreed-on blinded session key ($bsk_j$) by applying one of the decrypted contribution values ($y_j$) and the contribution value ($y_i$).

8. The computer program element according to claim 7, wherein each participating network device (D) chooses a private and public key ($d_i$, $e_i$) according to a public key encryption scheme by choosing the private key ($d_i$) as a random element from a set $Z_q$ of positive integers modulo q, where q is a prime, and the public key ($e_i$) is derived by raising a generator (g) of the multiplicative group ($G_q$) to the power of a first monotone function ($f_1$) of the private key ($d_i$).

9. The computer program element according to claim 8, wherein each participating network device (D) chooses a local contribution value ($y_i$) from a multiplicative group ($G_q$) of size q by first choosing a random value ($x_i$) from the set $Z_q$ and then deriving the contribution value ($y_i$) by raising the generator (g) to the power of a second monotone function ($f_2$) of the random value ($x_i$).

10. The computer program element according to claim 9, wherein each participating network device (D) encrypts the local contribution value ($y_i$) under the received public key ($e_j$) to an encrypted contribution value ($y_{ij}$) by raising the received public key ($e_j$) to the power of the second monotone function ($f_2$) of the random value ($x_i$).

11. The computer program element according to claim 10, wherein each participating network device (D) derives decrypted contribution values ($y_j$) by applying the private key ($d_i$) by raising the encrypted contribution ($y_{ji}$) to the power of the multiplicative inverse of the first monotone function ($f_1$) of the private key ($d_i$).

12. The computer program element according to claim 7, wherein each participating network device (D) derives a blinded session key ($bsk_i$) from the decrypted contribution values ($y_j$) and the local contribution value ($y_i$) by:
  deriving a first sequence of at least n−t participating network devices ($E_1$, $E_2$, $E_3$) comprising the local participating network device (D) and the participating network devices (A, B) from which the at least n−t−1 encrypted contribution values ($y_{ij}$) have been received;
  deriving a second sequence of at least n−t contribution values ($y_{i1}$, $y_{i2}$, $y_{i3}$), where the m'th contribution value ($y_{im}$) is the local contribution value ($y_i$) of the m'th participating network device ($E_m$);
  computing a third sequence of at least n−t quotients ($q_1$, $q_2$, $q_3$) where the m'th quotient ($q_m$) is defined as the m'th contribution value ($y_{im}$) divided by the m+1 modulo n−t'th contribution value ($y_{im+1 \bmod q}$); and
  defining the blinded session key ($bsk_i$) as the first sequence and the third sequence.

13. A computer program product stored on a computer usable medium, comprising computer readable program means for causing a computer to perform a method for generating a session key (sk) on demand in a network among n participating network devices (A, B, C, D) with up to t faulty devices, wherein t<n/2, the method comprising each participating network device (D):
  choosing a private and public key ($d_i$, $e_i$) according to a public key encryption scheme, and broadcasting the public key ($e_i$) to each other participating network device (A, B, C);
  choosing a local contribution value ($y_i$) from a multiplicative group ($G_q$) of size q;
  in each case of receiving a public key ($e_j$) from one of the other participating network devices (A, B, C), encrypting the local contribution value ($y_i$) under the received public key ($e_j$) to an encrypted contribution value ($y_{ij}$) and sending in reply to the one of the other participating network devices (A, B, C) the encrypted contribution value ($y_{ij}$);
  receiving at least n−t−1 encrypted contribution values ($y_{ji}$) and deriving decrypted contribution values ($y_j$) by applying the private key ($d_i$);
  deriving a blinded session key ($bsk_i$) from the decrypted contribution values ($y_j$) and the local contribution value ($y_i$);
  agreeing on one of the blinded session keys ($bsk_j$) by using an agreement protocol; and
  deriving the session key (sk) from the agreed-on blinded session key ($bsk_j$) by applying one of the decrypted contribution values ($y_j$) and the contribution value ($y_i$).

14. The computer program product according to claim 13, wherein each participating network device (D) chooses a private and public key ($d_i$, $e_i$) according to a public key encryption scheme by choosing the private key ($d_i$) as a random element from a set $Z_q$ of positive integers modulo q, where q is a prime, and the public key ($e_i$) is derived by raising a generator (g) of the multiplicative group ($G_q$) to the power of a first monotone function ($f_1$) of the private key ($d_i$).

15. The computer program product according to claim 14, wherein each participating network device (D) chooses a local contribution value ($y_i$) from a multiplicative group ($G_q$) of size q by first choosing a random value ($x_i$) from the set $Z_q$ and then deriving the contribution value ($y_i$) by raising the generator (g) to the power of a second monotone function ($f_2$) of the random value ($x_i$).

16. The computer program product according to claim 15, wherein each participating network device (D) encrypts the local contribution value ($y_i$) under the received public key ($e_j$) to an encrypted contribution value ($y_{ij}$) by raising the received public key ($e_j$) to the power of the second monotone function ($f_2$) of the random value ($x_i$).

17. The computer program product according to claim 16, wherein each participating network device (D) derives decrypted contribution values ($y_j$) by applying the private key ($d_i$) by raising the encrypted contribution ($y_{ji}$) to the power of the multiplicative inverse of the first monotone function ($f_1$) of the private key ($d_i$).

18. The computer program product according to claim 13, wherein each participating network device (D) derives a blinded session key ($bsk_i$) from the decrypted contribution values ($y_j$) and the local contribution value ($y_i$) by:
  deriving a first sequence of at least n−t participating network devices ($E_1$, $E_2$, $E_3$) comprising the local participating network device (D) and the participating network devices (A, B) from which the at least n−t−1 encrypted contribution values ($y_{ji}$) have been received;
  deriving a second sequence of at least n−t contribution values ($y_{i1}$, $y_{i2}$, $y_{i3}$), where the m'th contribution value ($y_{im}$) is the local contribution value ($y_i$) of the m'th participating network device ($E_m$);
  computing a third sequence of at least n−t quotients ($q_1$, $q_2$, $q_3$) where the m'th quotient ($q_m$) is defined as the m'th contribution value ($y_{im}$) divided by the m+1 modulo n−t'th contribution value ($y_{im+1 \bmod q}$); and
  defining the blinded session key ($bsk_i$) as the first sequence and the third sequence.

19. A computer device, comprising:
  a computer program product stored on a computer usable medium, comprising computer readable program means for causing a computer to perform a method for generating a session key (sk) on demand in a network among n participating network devices (A, B, C, D) with up to t faulty devices, wherein t<n/2, the method comprising each participating network device (D):
    choosing a private and public key ($d_i$, $e_i$) according to a public key encryption scheme, and broadcasting the public key ($e_i$) to each other participating network device (A, B, C);
    choosing a local contribution value ($y_i$) from a multiplicative group ($G_q$) of size q;
    in each case of receiving a public key ($e_j$) from one of the other participating network devices (A, B, C), encrypting the local contribution value ($y_i$) under the received public key ($e_j$) to an encrypted contribution value ($y_{ij}$) and sending in reply to the one of the other participating network devices (A, B, C) the encrypted contribution value ($y_{ij}$);

receiving at least n−t−1 encrypted contribution values ($y_{ji}$) and deriving decrypted contribution values ($y_j$) by applying the private key ($d_i$);

deriving a blinded session key ($bsk_i$) from the decrypted contribution values ($y_j$) and the local contribution value ($y_i$);

agreeing on one of the blinded session keys ($bsk_j$) by using an agreement protocol; and deriving the session key (sk) from the agreed-on blinded session key ($bsk_j$) by applying one of the decrypted contribution values ($y_j$) and the contribution value ($y_i$);

wherein the network device (A, B, C, D) comprises a processor for executing the computer program product when the computer program product is run on the computer device.

20. The computer program product according to claim 19, wherein each participating network device (D) chooses a private and public key ($d_i$, $e_i$) according to a public key encryption scheme by choosing the private key ($d_i$) as a random element from a set $Z_q$ of positive integers modulo q, where q is a prime, and the public key ($e_i$) is derived by raising a generator (g) of the multiplicative group ($G_q$) to the power of a first monotone function ($f_1$) of the private key ($d_i$).

21. The computer program product according to claim 20, wherein each participating network device (D) chooses a local contribution value ($y_i$) from a multiplicative group ($G_q$) of size q by first choosing a random value ($x_i$) from the set $Z_q$ and then deriving the contribution value ($y_i$) by raising the generator (g) to the power of a second monotone function ($f_2$) of the random value ($x_i$).

22. The computer program product according to claim 21, wherein each participating network device (D) encrypts the local contribution value ($y_i$) under the received public key ($e_j$) to an encrypted contribution value ($y_{ij}$) by raising the received public key ($e_j$) to the power of the second monotone function ($f_2$) of the random value ($x_i$).

23. The computer program product according to claim 22, wherein each participating network device (D) derives decrypted contribution values ($y_j$) by applying the private key ($d_i$) by raising the encrypted contribution ($y_{ji}$) to the power of the multiplicative inverse of the first monotone function ($f_1$) of the private key ($d_i$).

24. The computer program product according to claim 19, wherein each participating network device (D) derives a blinded session key ($bsk_i$) from the decrypted contribution values ($y_j$) and the local contribution value ($y_i$) by:

deriving a first sequence of at least n−t participating network devices ($E_1$, $E_2$, $E_3$) comprising the local participating network device (D) and the participating network devices (A, B) from which the at least n−t−1 encrypted contribution values ($y_{ji}$) have been received;

deriving a second sequence of at least n−t contribution values ($y_{i1}$, $y_{i2}$, $y_{i3}$), where the m'th contribution value ($y_{im}$) is the local contribution value ($y_i$) of the m'th participating network device ($E_m$);

computing a third sequence of at least n−t quotients ($q_1$, $q_2$, $q_3$) where the m'th quotient ($q_m$) is defined as the m'th contribution value ($y_{im}$) divided by the m+1 modulo n−t'th contribution value ($y_{im+1 \mod q}$); and defining the blinded session key ($bsk_i$) as the first sequence and the third sequence.

* * * * *